United States Patent
Kim et al.

(10) Patent No.: US 8,511,885 B2
(45) Date of Patent: Aug. 20, 2013

(54) LIGHT EMITTING DEVICE ASSEMBLY, BACKLIGHT UNIT AND DISPLAY DEVICE HAVING THE SAME

(75) Inventors: Moon Jeong Kim, Seoul (KR); Kum Tae Lee, Seoul (KR); Min Sang Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 221 days.

(21) Appl. No.: 13/184,054

(22) Filed: Jul. 15, 2011

(65) Prior Publication Data

US 2012/0014131 A1  Jan. 19, 2012

(30) Foreign Application Priority Data

Jul. 16, 2010  (KR) .................. 10-2010-0068939

(51) Int. Cl.
*F21V 7/04* (2006.01)
(52) U.S. Cl.
USPC ............ 362/634; 362/609; 362/612; 362/616
(58) Field of Classification Search
USPC ......... 362/608–609, 611–613, 616, 621–622, 362/628, 630–634; 349/58–60, 69
See application file for complete search history.

(56) References Cited

FOREIGN PATENT DOCUMENTS

| JP | 2000-147497 A | 5/2000 |
|---|---|---|
| JP | 2010-021131 A | 1/2010 |
| KR | 10-2000-0014947 A | 3/2000 |
| KR | 10-2001-0065164 A | 7/2001 |
| KR | 20-0247883 Y1 | 10/2001 |
| KR | 10-2004-20079682 A | 9/2004 |
| KR | 10-0879772 B1 | 1/2009 |
| KR | 10-2009-0025552 A | 3/2009 |

*Primary Examiner* — Jason Moon Han
(74) *Attorney, Agent, or Firm* — Birch, Stewart, Kolasch & Birch, LLP (57) ABSTRACT

Disclosed herein are a light emitting device assembly, a backlight unit and a display device having the same. The light emitting device assembly includes a light emitting device module having a light emitting device disposed on a board, a light guide plate to emit light incident from the light emitting device module in a direction differing from a light incidence direction, and a first fixing cover and a second fixing cover to connect the light emitting device module and the light guide plate. The first fixing cover and the second fixing cover are coupled by fixing members, protrusions are disposed on the second fixing cover at first regions corresponding to the fixing members, and the edge of the second fixing cover at second regions is bent.

9 Claims, 7 Drawing Sheets

LIGHT EMITTING DEVICE ASSEMBLY, BACKLIGHT UNIT AND DISPLAY DEVICE HAVING THE SAME

This application claims the benefit of Korean Patent Application No. 10-2010-0068939, filed on Jul. 16, 2010, which is hereby incorporated in its entirety by reference as if fully set forth herein.

BACKGROUND

The embodiments relate to a light emitting device assembly provided with light emitting elements, a backlight unit and a display device having the same.

Light emitting elements, such as light emitting diodes or laser diodes using group III-V or II-VI compound semiconductor materials, produce light of various colors, such as red, green, blue, and ultraviolet light, due to development of thin film growth techniques and element materials, and produce white light having high efficiency using fluorescent materials or through color mixing. Further, the light emitting elements have advantages, such as low power consumption, semi-permanent lifespan, fast response time, safety, and environmentally friendly properties as compared to conventional light sources, such as fluorescent lamps and incandescent lamps.

Therefore, these light emitting elements are increasingly applied to transmission modules of optical communication units, light emitting diode backlights as a replacement for cold cathode fluorescent lamps (CCFLs) constituting backlights of liquid crystal display (LCD) devices, lighting apparatuses using white light emitting diodes as a replacement for fluorescent lamps or incandescent lamps, headlights for vehicles and traffic lights.

SUMMARY

Accordingly, the embodiment is directed to a light emitting device assembly, a backlight unit and a display device having the same.

An object of the embodiment is to provide a light emitting device assembly in which a light guide plate is stably mounted without coming-off, a backlight unit and a display device having the same.

Additional advantages, objects, and features of the embodiment will be set forth in part in the description which follows and in part will become apparent to those having ordinary skill in the art upon examination of the following or may be learned from practice of the embodiment. The objectives and other advantages of the embodiment may be realized and attained by the structure particularly pointed out in the written description and claims hereof as well as the appended drawings.

To achieve this object and other advantages and in accordance with the purpose of the embodiment, as embodied and broadly described herein, a light emitting device assembly includes a light emitting device module having light emitting device disposed on a board, a light guide plate to emit light incident from the light emitting device module in a direction differing from a light incidence direction, and a first fixing cover and a second fixing cover to connect the light emitting device module and the light guide plate, wherein the first fixing cover and the second fixing cover are coupled by fixing members, protrusions are disposed on the second fixing cover at first regions corresponding to the fixing members, and the edge of the second fixing cover at second regions is bent.

In another aspect of the embodiment, a backlight unit includes a plurality of light emitting device assemblies, each of which includes a light emitting device module HAVING a light emitting device, a light guide plate to emit light incident from the light emitting device module in a direction differing from a light incidence direction, and a first fixing cover and a second fixing cover to connect the light emitting device module and the light guide plate, the first fixing cover and the second fixing cover being coupled by fixing members, protrusions being disposed on the second fixing cover at first regions corresponding to the fixing members, and the edge of the second fixing cover at second regions being bent, an optical sheet to diffuse the light emitted by the plurality of light emitting device assemblies, and a bottom cover to receive the plurality of light emitting device assemblies and the optical sheet.

In a further aspect of the embodiment, a display device includes a plurality of light emitting device assemblies, each of which includes a light emitting device module HAVING a light emitting device, a light guide plate to emit light incident from the light emitting device module in a direction differing from a light incidence direction, and a first fixing cover and a second fixing cover to connect the light emitting device module and the light guide plate, the first fixing cover and the second fixing cover being coupled by fixing members, protrusions being disposed on the second fixing cover at first regions corresponding to the fixing members, and the edge of the second fixing cover at second regions being bent, an optical sheet to diffuse the light emitted by the plurality of light emitting device assemblies, a panel provided on the optical sheet to implement an image by means of the emitted light, and a bottom cover to receive the plurality of light emitting device assemblies and the optical sheet.

Parts of the edge of the second fixing cover may be bent.

The bending parts of the second fixing cover may surround the edge of the first fixing cover.

Cut parts may be disposed between the bending parts and the protrusions.

The bending parts may be disposed by cutting off both side surfaces of the protrusions and bending regions of the edge of the second fixing cover between the protrusions.

The light emitting device assembly may further include edge fixing members respectively disposed within a distance of 10 mm from both ends of the first fixing cover and the second fixing cover.

The light emitting device assembly may further include a reflective sheet facing the light guide plate to reflect light incident from the light guide plate back to the light guide plate.

The light emitting device module may be disposed between the first fixing cover and the second fixing cover.

The board may contact the second fixing cover.

The light emitting device may DISPOSE the first fixing cover.

The plurality of light emitting device assemblies may be arranged in at least two in the horizontal direction and at least two in the vertical direction.

In the light emitting device assembly, the backlight unit and the display device having the same in accordance with embodiments of the embodiment, a light guide plate is stably mounted in the light emitting device assembly without coming-off.

It is to be understood that both the foregoing general description and the following detailed description of the embodiment are exemplary and explanatory and are intended to provide further explanation of the embodiment as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device and a method of manufacturing the same according to the embodiment will be described with reference to accompanying drawings.

Figure 1:
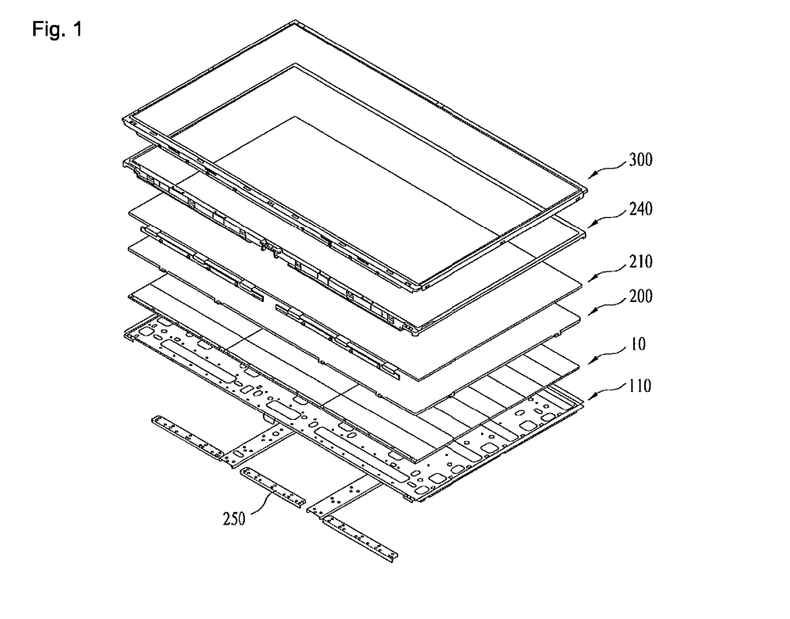
FIG. 1 is an exploded perspective view of a display device in accordance with one embodiment of the embodiment.

FIG. 1 is an exploded perspective view of a display device in accordance with one embodiment of the embodiment.

As shown in FIG. 1, the display device in accordance with this embodiment of the embodiment includes light emitting device assemblies 10 provided on a bottom cover 110, an optical sheet 200 provided on the light emitting device assemblies 10, and a panel 210 provided on the optical sheet 200.

A support member 240 is provided at the edges of the bottom cover 110, the light emitting device assemblies 10, the optical sheet 200 and the panel 210 so as to support and fix the bottom cover 110, the light emitting device assemblies 10, the optical sheet 200 and the panel 210, and a top cover 300 is provided on the support member 240.

Here, the bottom cover 110, and the light emitting device assemblies 10 and the optical sheet 200 constitute a backlight unit. A plurality of light emitting device assemblies 10 is disposed on the inner surface of the bottom cover 110 so as to be adjacent to each other.

At least one beam member 250 disposed in the vertical direction or the horizontal direction is provided at the rear of the bottom cover 110. The beam member 250 prevents thermal deformation or physical deformation of the bottom cover 110.

The beam member 250 may be extended in one direction, and be made of a metal material having a lower thermal expansion coefficient and higher stiffness than the bottom cover 110.

A power supply device (not shown) to supply power to the backlight unit and the panel 210 and a substrate (not shown) on which other drive circuits are mounted may be provided on the rear surface of the bottom cover 110.

Here, the plurality of light emitting device assemblies 10 is disposed on the bottom cover 110 constituting the backlight unit so as to be adjacent to each other.

Figure 2:
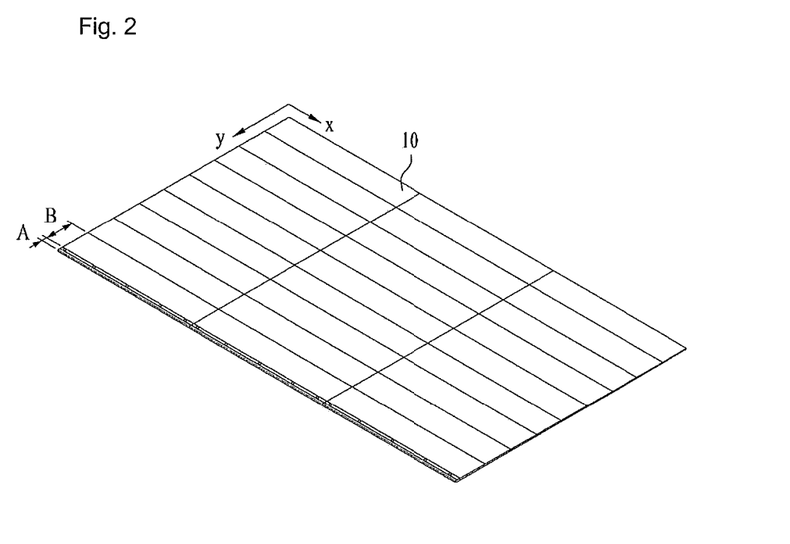
FIG. 2 is a perspective view illustrating arrangement of a plurality of light emitting device assemblies.

As shown in FIG. 2, the plurality of light emitting device assemblies 10 is provided, and is disposed in a matrix having a plurality of columns in the horizontal direction, i.e., in the direction of the x-axis, and a plurality of rows in the vertical direction, i.e., in the direction of the y-axis. For example, 27 light emitting device assemblies 10 may be disposed in a 3×9 matrix.

Each of the above-described light emitting device assemblies 10 includes a light generation region A generating light and a light emission region B emitting light. Except for the lowermost light emitting device assemblies 10, light generation regions A of the light emitting device assemblies 10 may be shielded by the light emission regions B of the lower light emitting device assemblies 10.

Through such a structure, the light generation regions A of the light emitting device assemblies 10 except for the lowermost light emitting device assemblies 10 are not exposed to the outside. Here, non-exposure of the light generation regions A to the outside means non-exposure of the light generation regions A in the direction of the panel 210.

Figures 3, 4:
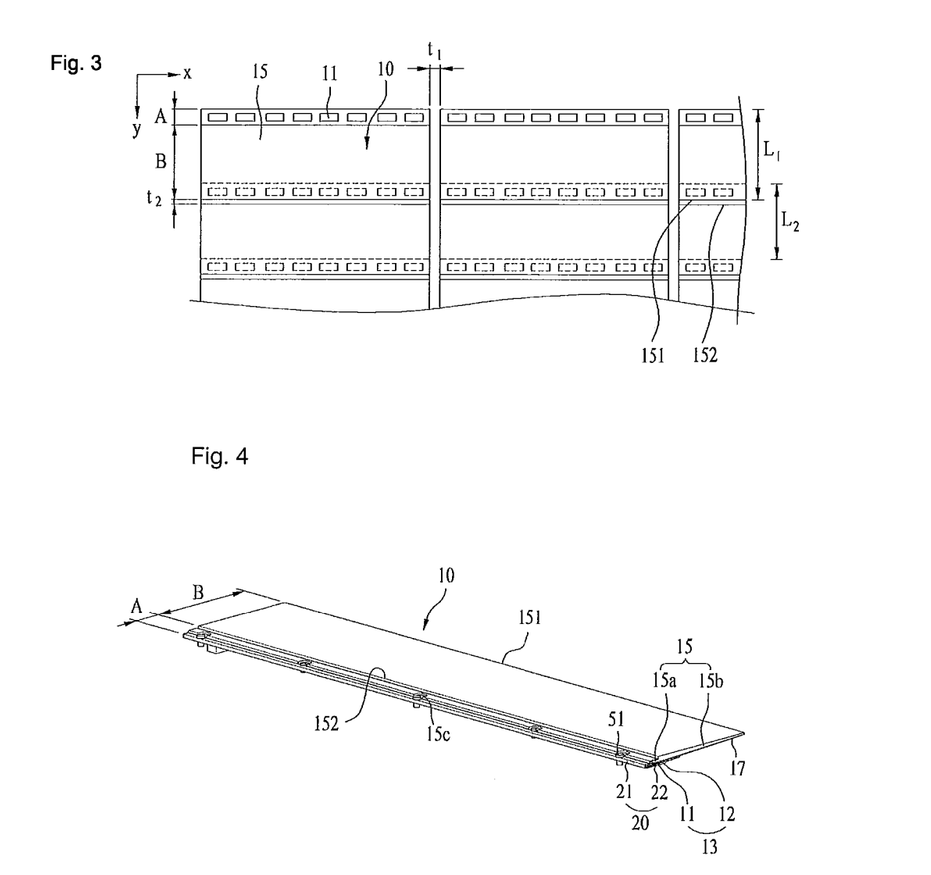
FIG. 3 is a plan view illustrating the arrangement of the plurality of light emitting device assemblies of FIG. 2.
FIGS. 4 and 5 are perspective views illustrating the front surface of one light emitting device assembly in accordance with the embodiment of the embodiment.

As shown in FIG. 3, if the light emitting device assemblies 10 are disposed so as to partially overlap each other, light guide plates 15 of the respective light emitting device assemblies 10 are separated from each other by designated distances in the vertical and the horizontal directions.

Here, the x direction means the horizontal direction in which the light emitting device assemblies 10 are separated from each other by a designated distance $t_1$ without overlapping, and the y direction means the vertical direction in which the light emitting device assemblies 10 are overlapped to some degree. Further, a vertical region of one specific light emitting device assembly 10 is defined as $L_1$, and a vertical region of another light emitting device assembly 10 partially overlapping the former light emitting device assembly 10 is defined as $L_2$.

An end 151 of the light guide plate 15 of the light emitting device assembly 10 having the vertical region $L_1$ is separated from a stepped part 152 of the light guide plate 15 of the light emitting device assembly 10 having the vertical region $L_2$ by a designated distance $t_2$.

If the designated distances $t_1$ and $t_2$ are set in the above-described manner, the light guide plates 15 are made of a resin and thus although thermal expansion occurs due to heat generated by a light emitting device module, the light guide plates 15 are not deformed or damaged by contact between the neighboring light guide plates 15.

Particularly, if light sources include light emitting diodes (LEDs) and the light guide plates 15 are made of a resin having a high thermal expansion coefficient, the light guide plates 15 may be thermally expanded due to heat emitted from the LEDs.

In view of these characteristics, if the light guide plates 15 are disposed so as to contact each other prior to thermal expansion, the light guide plates 15 mutually apply pressure to each other during thermal expansion and thus may be damaged or thermally deformed.

Further, the light emitting device assemblies 10 including the light guide plates 15 may be dislocated.

However, the respective light guide plates 15 do not contact the adjacent light guide plates 15 and are separated from the adjacent light guide plates 15 by designated intervals, as described above, thereby solving problems, such as deformation and dislocation due to thermal expansion.

Since light sources 11 are disposed on the lower surfaces of the light guide plates 15 of the light emitting device assemblies 10 of the embodiment, which will be described later, the light emitting device assemblies 10 embody an edge-type backlight.

On the other hand, since the respective light emitting device assemblies 10 are disposed so as to be adjacent to each other and each of the light emitting device assemblies 10 serves as one light source, the light emitting device assemblies 10 have direct-type backlight characteristics.

However, in this case, as compared to a general direct-type light source having characteristics of a point light source, the light emitting device assemblies 10 of the embodiment have characteristics of a surface light source. Therefore, the light emitting device assemblies 10 solve a problem in which light sources form hot spots on a screen, and are thinner than the general direct-type light source.

As shown in FIG. 4, the light emitting device assembly 10 is divided into the light generation region A and the light emission region B.

The light generation region A includes a light emitting device module 13 including the light sources 11 and a board 12, and a light incidence part 15a (with reference to FIG. 8A) constituting a part of the light guide plate 15 and disposed adjacent to the light sources 11 such that light from the light sources 11 is incident upon the light incidence part 15a.

The light emitting device module 13 and the light incidence part 15a of the light guide plate 15 are surrounded by fixing covers 20, thus being connected.

The fixing covers 20 serve to cover front and rear portions of the light generation region A. The front portion of the light generation region A is surrounded by a first fixing cover 21 and the rear portion of the light generation region A is surrounded by a second fixing cover 21. Here, the rear portion of the light generation region A denotes a portion in a direction from the light sources 11 to the board 12 and the front portion of the light generation region A denotes a portion in a direction opposite to the rear portion.

The light emission region B includes a light emission part 15b constituting a part of the light guide plate 15 and a reflective sheet 17 disposed at the rear of the light emission part 15b. The light emission part 15b is connected with the light incidence part 15a and is extended in one direction.

The stepped part 152 is provided at the boundary between the light incidence part 15a and the light emission part 15b. The end 151 is provided at the tip of the light emission part 15b, and the thickness of the end 151 is the thinnest among other parts of the light guide plate 15.

Figure 5:
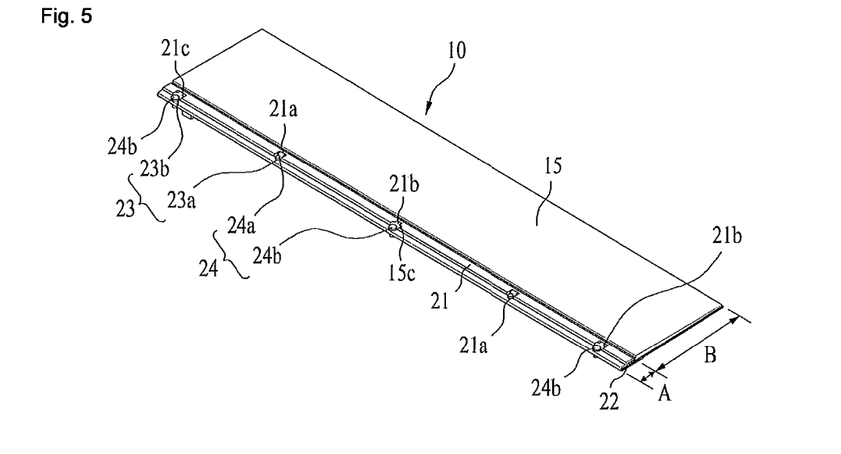

As shown in FIG. 5, holes into which parts of the light guide plate 15 are inserted are provided on the first fixing cover 21, and hereinafter, these holes will be referred to as fixing holes 21a and 21b.

Since the parts of the light guide plate 15 are connected to the fixing holes 21a and 21b, set of the positions of the light guide plate 15 and the first fixing cover 21 with respect to each other may be possible.

Designated insertion holes 23; 23a and 23b are provided beside the fixing holes 21a and 12b, and screw-shaped fixing members 24; 24a and 24b are inserted into the insertion holes 23a and 23b.

Among the insertion holes 23; 23a and 23b provided on the first fixing cover 21, the insertion holes 23b located at the center and both ends of the first fixing cover 21 are provided so as to fix the light emitting device assembly 10 to the bottom cover 110 (with reference to FIG. 1) using the fixing members 24b.

The small insertion holes 23a located at both sides of the insertion hole 23b located at the center of the first fixing cover 21 are provided so as to connect the light guide plate 15 and the light emitting device module 13 using the fixing members 24a.

Figure 6:
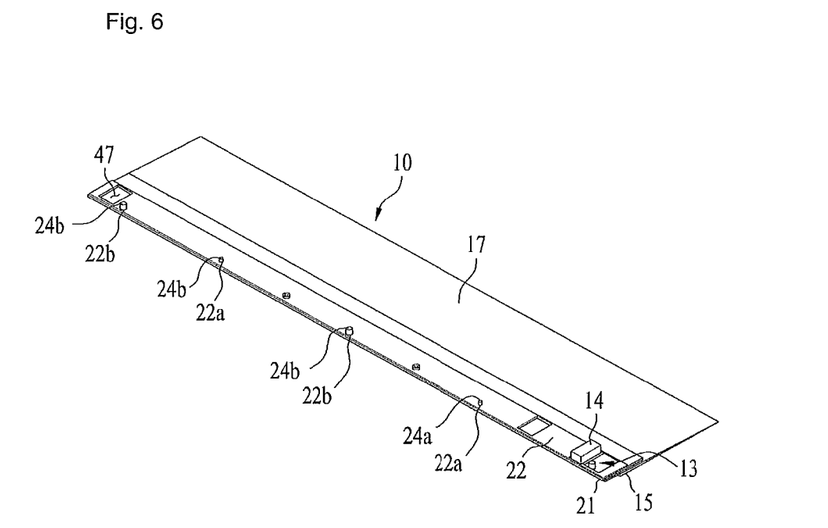
FIG. 6 is a perspective view illustrating the rear surface of the light emitting device assembly in accordance with the embodiment of the embodiment.

As shown in FIG. 6 illustrating the rear surface of the light emitting device assembly 10, the rear surface of the light guide plate 15 is covered with the reflective sheet and the second fixing cover 22 is provided under the reflective sheet 17 so as to cover the reflective sheet 17 and the light guide plate 15 while fixing the reflective sheet 17 and the light guide plate 15.

Coupling holes 22a and 22b corresponding to the insertion holes 23a and 23b disposed on the first fixing cover 21 are disposed on the second fixing cover 22.

The fixing members 24; 24a and 24b pass through the insertion holes 23a and 23b and the coupling holes 22a and 22b, and ends of the relatively large fixing members 24b are protruded relatively farther so that the protruded ends of the fixing members 24b are connected with the bottom cover 110 (with reference to FIG. 1).

Further, connector holes 47 are provided on the second fixing cover 22, and a connector 14 connected to the light emitting device module 13 is inserted into one of the connector holes 47 and connected to the bottom cover 110 (with reference to FIG. 1).

A plurality of connector holes 47 may be provided on the second fixing covers 22. Because the position of the connector 14 may be varied according to the position at which the light emitting device assembly 10 is connected to the bottom cover 110.

The connector 14 is connected to the power supply device (not shown) provided on the bottom cover 110, and power is supplied to the light emitting device module 13 by means of such connection.

Figure 7A:
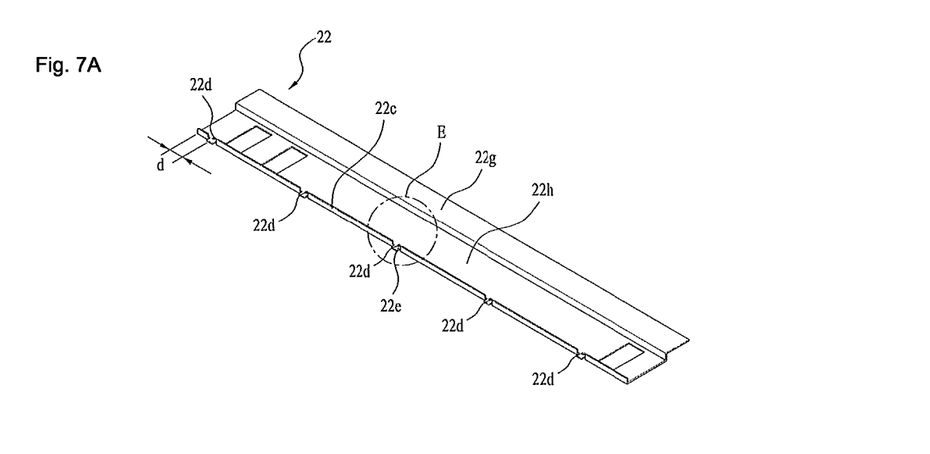
FIG. 7A is a perspective view of a second fixing cover of the light emitting device assembly in accordance with the embodiment of the embodiment.
Figure 7B:
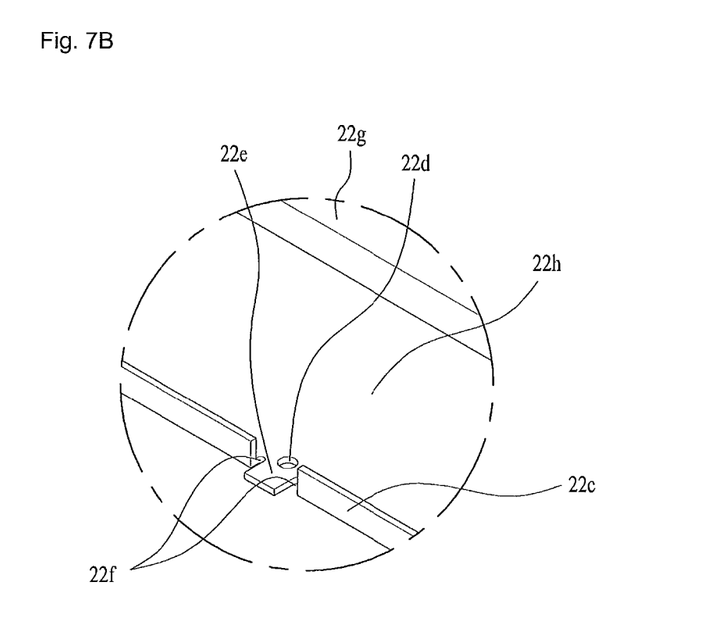
FIG. 7B is an enlarged view of the portion 'E' of FIG. 7A.

FIG. 7A is a perspective view of the second fixing cover of the light emitting device assembly in accordance with the embodiment of the embodiment, and FIG. 7B is an enlarged view of the portion 'E' of FIG. 7A.

The second fixing cover 22 serves to support the light guide plate 15 in the above-described light emitting device assembly 10 from the bottom. The second fixing cover includes a first forming part 22g and a second forming part 22h which are provided in a stepped structure. The first forming part 22g supports an inclined plane of the light guide plate 15 and the reflective sheet 17, and the second forming part 22b supports the board 12 to which the light sources 11 are fixed.

Coupling holes 22d are provided in predetermined number at the edge of the second forming part 22b. The coupling holes 22d correspond to the insertion holes 23a and 23b disposed on the first fixing cover 21.

Protrusions 22e are provided at the edge of the second forming part 22b corresponding to the respective coupling holes 22d. Here, the protrusions 22e are extended from the second forming part 22b and support the first fixing cover 21 in the light emitting device assembly 10, as will be described later.

The edge of the second forming part 22b at regions where the protrusions 22e are not disposed is bent, thus forming bending parts 22c. Here, the bending parts 22c of the second forming part 22b are bent at an angle of about 90 degrees so as to surround the edge of the second fixing cover 22.

Cut parts 22f are disposed between the protrusions 22e and the bending parts 22c of the second forming part 22b. That is, the second fixing cover 22 including the first forming part 22g and the second forming part 22h is prepared, both ends of the protrusions 22e are cut off, and regions of the second forming parts 22b between the protrusions 22e are bent at an angle of about 90 degrees. Thereby, the bending parts 22c are easily disposed without deformation of the protrusions 22e due to the cut parts 22f.

Among the coupling holes 22d, the coupling holes 22d provided at both ends of the second fixing cover 22 are referred to as edge coupling holes 22d. The edge coupling holes 22d are provided within a distance of 10 mm from both ends of the second fixing covers 22, thereby allowing both ends of the light guide plate 15 to be fixed without coming-off.

Hereinafter, with reference to FIGS. 8A and 8B, the structure of the light emitting device assembly and the functions of the first fixing cover and the second fixing cover will be described.

Figure 8A:
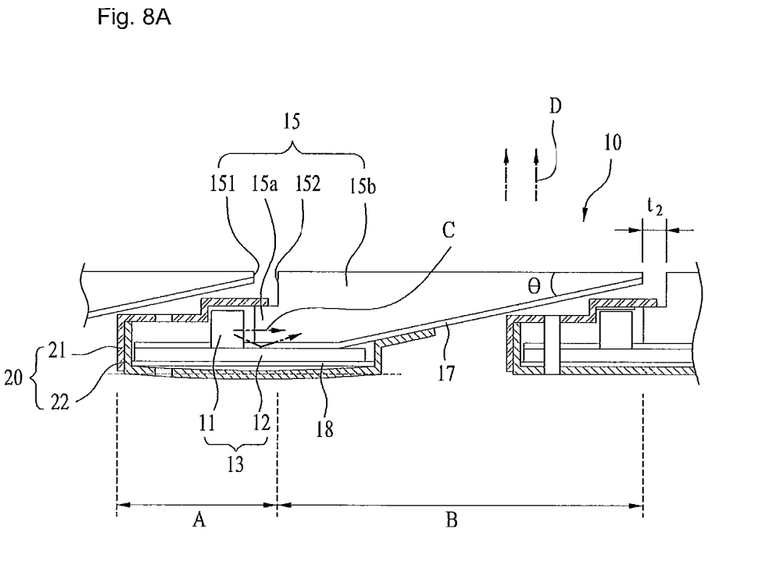
FIG. 8A is a cross-sectional view of the light emitting device assembly before fixing members are connected to the light emitting device assembly.

FIG. 8A is a cross-sectional view of the light emitting device assembly before the fixing members are connected to the light emitting device assembly.

As shown in FIG. 8, the light emitting device assembly 10 is divided into the light generation region A and the light emission region B, and the light generation unit A generally includes the light emitting device module 13 including the LED type light sources 11 and the board 12.

The side surface of the light incidence part 15a of the light guide plate 15 faces the light sources 11, and when the light sources 11 generate light, the light moves in the direction C and is incident upon the light incidence part 15a.

The light emission part 15b is connected integrally with the light incidence part 15a, and light entering through the light incidence part 15a is subjected to total reflection and diffused reflection within the light guide plate 15 and is then emitted to the outside of the light guide plate 15.

Here, after light generated by the light sources is emitted throughout the light emission part 15b, the light directed to the rear portion (or the lower portion) of the light guide plate 15 is reflected by the reflective sheet 17 provided at the rear portion (or the lower portion) of the light guide plate 15, is incident back upon the light guide plate 15 and is generally emitted in the direction D.

The reflective sheet 17 is disposed at the rear portion (or the lower portion) of the light guide plate 15, and a part of the reflective sheet 17 is inserted between the board 12 constituting the light emitting device module 13 and the light guide plate 15 so as to be fixed.

As described above, light incident upon the light guide plate 15 from the light sources 11 is directed to the upper portion of the light guide plate 15, i.e., toward the panel, through total reflection and/or diffused reflection.

Connection relation among the light emitting device module 13, the light guide plate 15 and the reflective sheet 17 is maintained by the fixing covers 20. The first fixing cover 21 having the stepped structure is disposed on the front portion (or the upper portion) of the light emitting device assembly 10 and the second fixing cover 22 is disposed on the rear portion (or the lower portion) of the light emitting device assembly 10.

Here, it is confirmed that the lower end of the second fixing cover 22 is partially warped, as compared to the horizontal plane expressed as a dotted line in FIG. 8A. If the second fixing cover 22 includes the first forming part 22g and the second forming part 22h, as described above, the second forming part 22b may be partially warped during a process of forming a stepped part.

The light sources 11 generate light in the direction of the light incidence part 15a of the light guide plate 15, and thereby most of the light generated by the light sources 11 is directed to the light incidence part 15a of the light guide plate 15.

The second fixing cover 22 is disposed adjacent to the board 12, and a heat dissipation member 18 to transmit heat generated by the circuit board 12 to the second fixing cover 22 is provided between the board 12 and the second fixing cover 22.

That is, the light sources 11 may be disposed on the first fixing cover 21, and the second fixing cover 22 may be disposed on the board 12.

If heat generated by the light emitting device module 13 remains on the board 12, the heat causes abnormality in generation of light by the light sources 11. Therefore, in order to rapidly transmit the generated heat to the outside, the heat dissipation member 18 is provided. The heat dissipation member 18 is made of a material having high thermal conductivity, such as metal or graphite.

The light emission part 15b of the light guide plate 15 is configured such that the lower surface of the light emission part 15b has a designated inclination angle θ and the thickness of the light emission part 15b decreases in the direction of the end 151.

Further, the end 151 of the light guide plate 15 of the light emitting device assembly 10 is disposed so as to cover the light emission region A of the adjacent light emitting device assembly 10. Here, the inclination angle θ of the light emission part 15b may vary according to circumstance. However, the inclination angle θ of the light emission part 15b is optimized so that light incident upon the light incidence part 15a is diffused and reflected by the lower surface of the light emission part 15b and is thus maximally efficiently emitted through the upper surface of the light emission part 15b.

The end of the reflective sheet 17 disposed along the inclined plane disposed on the lower surface of the light guide plate 15 may be provided so as to end at the stepped part 152 of the light guide plate 15, or may be provided so as to exceed the stepped part 152 and contact the adjacent light guide plate 15.

That is, the light guide plates 15 are disposed such that one light guide plate 15 is separated from the adjacent light guide plate 15 by a designated interval due to thermal expansion, and the reflective sheet 17 shields such a separation interval so that light emitted from the light guide plate 15 is reflected to the front portion (or the upper potion) of the light guide plate 15.

Therefore, generation of dimming lines on a screen may be prevented and optical loss may be minimized.

Figure 8B:
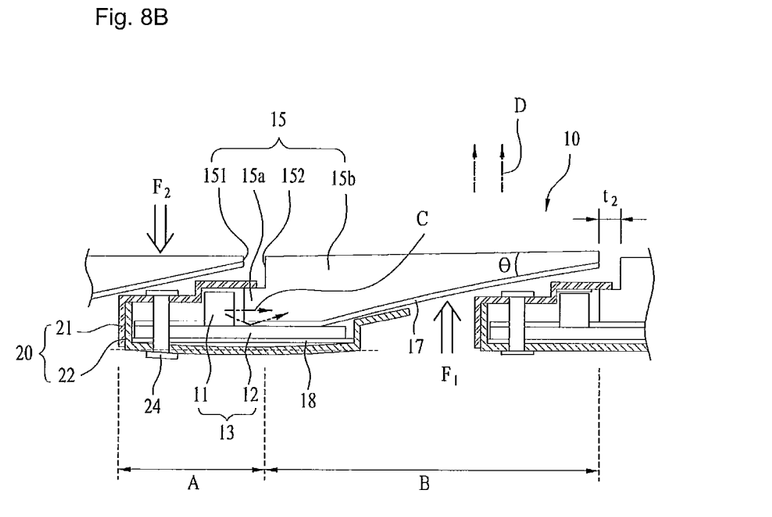
FIG. 8B is a cross-sectional view illustrating warpage of a light guide plate when fixing members are connected to a conventional light emitting device assembly.

FIG. 8B is a cross-sectional view illustrating warpage of a light guide plate when the fixing members are connected to a conventional light emitting device assembly.

As shown in FIG. 8B, the first and second fixing covers 21 and 22 and the board 12 are connected by the fixing members 24. Here, it is confirmed that the lower end of the second fixing cover 22 is partially warped, as compared to the horizontal plane expressed as a dotted line in FIG. 8B. When the first fixing cover 21 and the second fixing cover 22 are coupled by the fixing members 24, the first and second fixing covers 21 and 22 are coupled only at specific portions thereof by the screw-shaped fixing members 24 and thus pressure may be applied to other portions.

That is, as shown in FIG. 8B, force $F_2$ in the downward direction may be applied to the light emitting device assembly 10 by the fixing members 24. Further, since the fixing members 24 are located at the left portion of the light emitting device assembly 10, force $F_1$ in the upward direction may be applied to the right portion of the light guide plate 15. Therefore, as shown in FIG. 8B, the light guide plate 15 and/or the reflective sheet 17 is/are separated from the second fixing cover 22 by a designated interval.

Figure 9A:
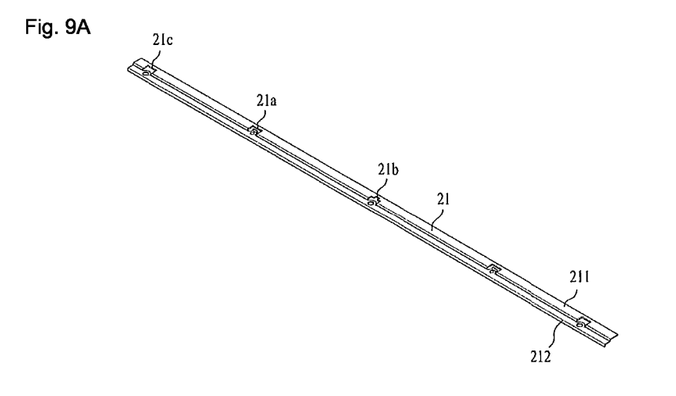
FIG. 9A is a perspective view illustrating the front surface of a first fixing cover.
Figure 9B:
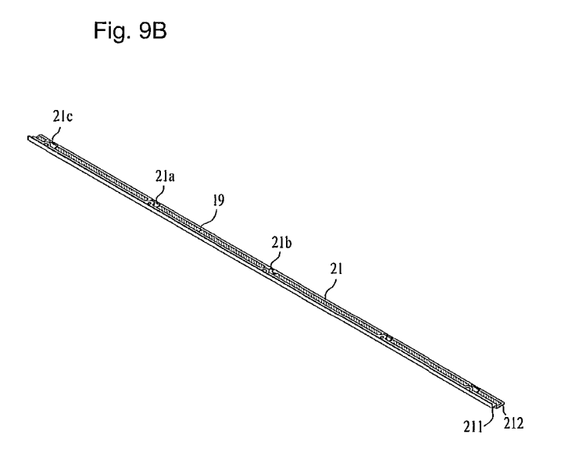
FIG. 9B is a perspective view illustrating the rear surface of the first fixing cover.
Figure 9C:
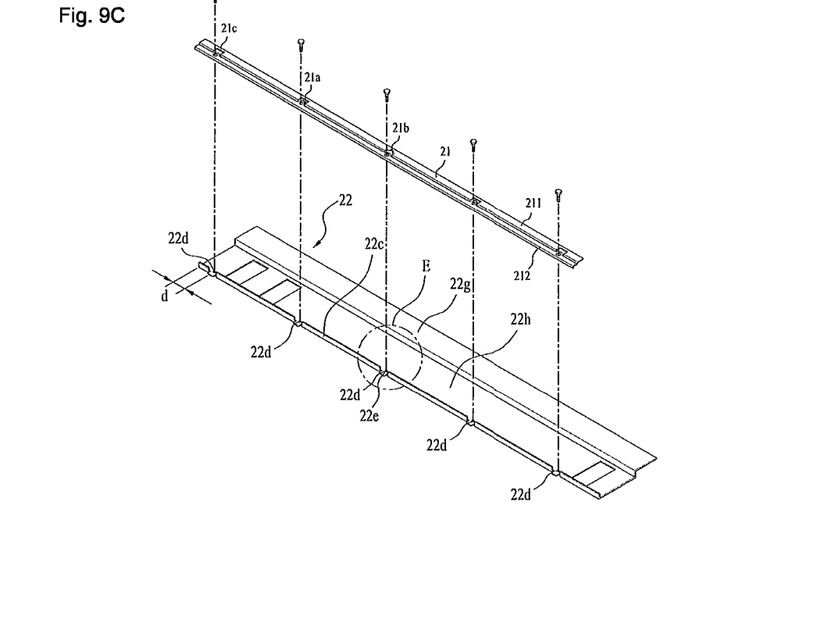
FIG. 9C is a perspective view illustrating connection of the first fixing cover and the second fixing cover.

FIG. 9A is a perspective view illustrating the front surface of the first fixing cover of the light emitting device assembly in accordance with the embodiment of the embodiment, FIG. 9B is a perspective view illustrating the rear surface of the first fixing cover, and FIG. 9C is a perspective view illustrating connection of the first fixing cover of FIGS. 9A and 9B and the second fixing cover of FIG. 7A.

As shown in FIGS. 9A to 9C, the first fixing cover includes a first support part 211 contacting the light guide plate 15 to support the light guide plate 15, and a second support part 212 connected with the first support part 211 so as to be bent from the first support part 211 in a stepped structure.

The fixing holes 21a and 21b separated from each other by designated intervals are disposed between the first support part 211 and the second support part 212, and protrusions 15c provided on the light guide plate 15 are inserted into the fixing holes 21a and 21b.

The light sources 11 are disposed adjacent to the first fixing cover 21, and the height of the light sources 11 is similar to the depth of the fixing holes 21a and 21b. Because the protrusions 15c of the light guide plate 15 are disposed on the inner upper surface of the fixing holes 21a and 21b, the light emitting device module 13 is disposed just under the light guide plate 15, and the light sources 11 are disposed at both sides of the fixing holes 21a and 21b.

FIG. 9C illustrates connection of the first fixing cover 21 and the second fixing cover 22. The light emitting device module 13 is fixed onto the second forming part 22b of the second fixing cover 22. The screw-shaped fixing members are connected to the fixing holes 21a and 21b of the first fixing cover 21 and the coupling holes 22d of the second fixing cover 22, and it is apparent that the reflective sheet 17, the light guide plate 15 and the light emitting device modules 13, which are not shown in FIG. 9C, are fixed between the first fixing cover 21 and the second fixing cover 22.

That is, the first fixing cover 21 and the second fixing cover 22 are coupled by the fixing members 24. The protrusions 22e to support the first fixing cover 21 are disposed on the second fixing cover 22 at first regions corresponding to the fixing members 24, and at least a part of the edge of the second fixing cover 22 at second regions is bent.

Further, the second support part 212 of the first fixing cover 21 is supported by the protrusions 22e of the second fixing cover 22, and the bending parts 22c of the second fixing cover 22 surround the second support part 212 of the first fixing cover 21.

Figure 10:
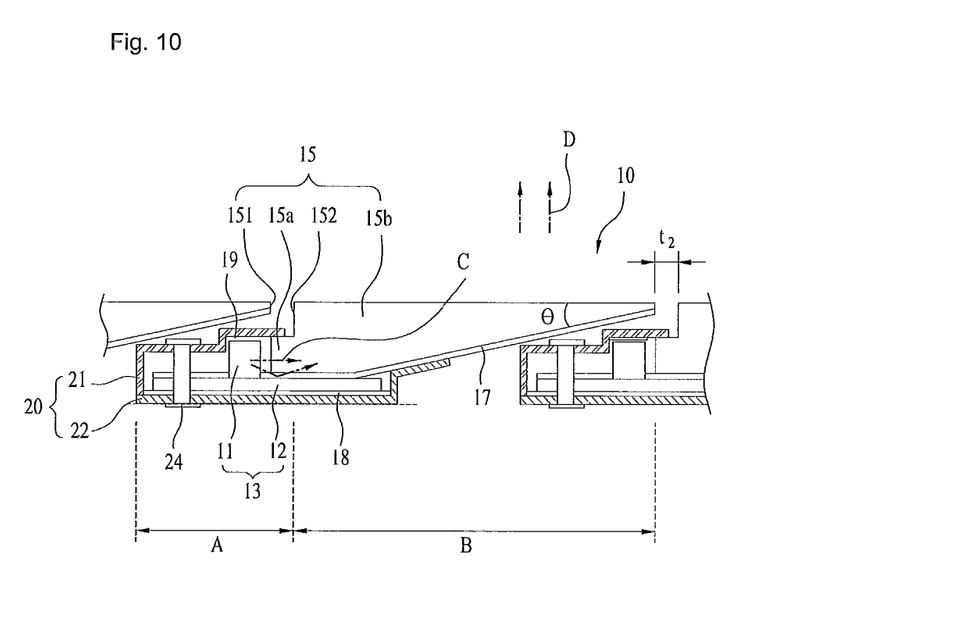
FIG. 10 is a cross-sectional view of a light emitting device assembly in accordance with another embodiment.

FIG. 10 is a cross-sectional view of a light emitting device assembly in accordance with another embodiment.

The light emitting device assembly in this embodiment is basically similar to the light emitting device assembly of FIG. 8B, and is different from the light emitting device assembly of FIG. 8B in that the light emitting device assembly in this embodiment uses the second fixing cover 22 of FIG. 7A. That it, the protrusions 22e (with reference to FIG. 7A) provided at the end of the second forming part 22b (with reference to FIG. 7A) of the second fixing cover 22 support the first fixing cover 21, and simultaneously the bending parts 22c (with reference to FIG. 7A) surround the first fixing cover 21.

Therefore, when the first fixing cover 21 and the second fixing cover 22 are coupled by the fixing members 24, the first fixing cover 21 presses the second fixing cover 22, and thus the first forming part 22g (with reference to FIG. 7A) of the second fixing cover 22 contacts the reflective sheet 17 and the light guide plate 15.

As described above, a plurality of light emitting device assemblies in accordance with embodiments is arranged in a matrix having plural rows and plural columns and is used as light sources of a backlight unit.

Further, a light emitting device assembly, a backlight unit and a display device having the same in accordance with the embodiments allow a light guide plate to be stably mounted in the light emitting device assembly without coming-off.

The features, structures and effects described in the above embodiments are included in at least one embodiment and are not limited to only one embodiment. Further, it will be apparent to those skilled in the art that various combinations or modifications of the features, structures and effects described in the above embodiments can be made. Thus, it is intended that the embodiment covers the combinations and modifications of the features, structures and effects provided they come within the scope of the appended claims and their equivalents.

It will be apparent to those skilled in the art that various modifications and variations can be made in the embodiment without departing from the spirit or scope of the embodiment. Thus, it is intended that the embodiment covers the modifications and variations of this embodiment provided they come within the scope of the appended claims and their equivalents.

What is claimed is:

1. A backlight unit comprising:
a plurality of light emitting device assemblies, each of which includes a light emitting device module having a light emitting device, a light guide plate to emit light incident from the light emitting device module in a direction different from a light incidence direction, and a first fixing cover and a second fixing cover to connect the light emitting device module and the light guide plate, the first fixing cover and the second fixing cover being coupled by fixing members, protrusions being disposed on the second fixing cover at first regions corresponding to the fixing members, and bending parts are formed on second regions of the second fixing cover, wherein cut parts are disposed between the first regions of the second fixing cover and the second regions of the second fixing cover;
an optical sheet to diffuse the light emitted by the plurality of light emitting device assemblies; and
a bottom cover to receive the plurality of light emitting device assemblies and the optical sheet.

2. The backlight unit according to claim 1, wherein the plurality of light emitting device assemblies is arranged in at least two in the horizontal direction and at least two in the vertical direction.

3. The backlight unit according to claim 1, wherein at least parts of an edge of the second fixing cover are bent.

4. The backlight unit according to claim 1, wherein the bending parts of the second fixing cover surround an edge of the first fixing cover.

5. The backlight unit according to claim 1, further comprising edge fixing members respectively disposed within a distance of 10 mm from both ends of the first fixing cover and the second fixing cover.

6. The backlight unit according to claim 1, wherein the light emitting device module is disposed between the first fixing cover and the second fixing cover.

7. The backlight unit according to claim 6, wherein a board is disposed on the second fixing cover.

8. The backlight unit according to claim 6, wherein the light emitting device module is disposed on the first fixing cover.

9. A display device comprising:
a plurality of light emitting device assemblies, each of which includes a light emitting device module having a light emitting device, a light guide plate to emit light incident from the light emitting device module in a direction different from a light incidence direction, and a first fixing cover and a second fixing cover to connect the light emitting device module and the light guide plate, the first fixing cover and the second fixing cover being coupled by fixing members, protrusions being disposed on the second fixing cover at first regions corresponding to the fixing members, and bending parts are formed on second regions of the second fixing cover, wherein cut parts are disposed between the first regions of the second fixing cover and the second regions of the second fixing cover;
an optical sheet to diffuse the light emitted by the plurality of light emitting device assemblies;
a panel provided on the optical sheet to implement an image by means of the emitted light; and
a bottom cover to receive the plurality of light emitting device assemblies and the optical sheet.

* * * * *